United States Patent [19]

Permann

[11] 3,727,584
[45] Apr. 17, 1973

[54] ANIMAL FOOD SUPPLEMENT DISPENSER AND FEEDER

[76] Inventor: Arthur C. Permann, Delmont, S. Dak. 57330

[22] Filed: Sept. 16, 1971

[21] Appl. No.: 181,075

[52] U.S. Cl. .............................................. 119/56 R
[51] Int. Cl. ................................................ A01k 05/00
[58] Field of Search ............................. 119/56 R, 54

[56] References Cited

UNITED STATES PATENTS

| | | | |
|---|---|---|---|
| 3,213,829 | 10/1965 | Zumbahlen | 119/56 R |
| 2,352,859 | 7/1944 | Palmer | 119/54 |
| 3,034,688 | 5/1962 | Rudd | 119/56 R X |
| 867,221 | 9/1907 | Croshier | 119/56 R |

Primary Examiner—Hugh R. Chamblee
Attorney—Arthur E. Ringsrud

[57] ABSTRACT

An elongated supply hopper having a plurality of longitudinally spaced discharge apertures, individual feeder valves for each of the discharge apertures, and delivery conduits individual to each discharge aperture for delivery of food to individual feed trough means. Discharge valves in each of the delivery conduits cooperate with respective feeder valves and metering valve elements individual to each delivery conduit to define measuring chambers. Feeder valve operating means and discharge valve operating means control feeding of material from the hopper to each measuring chamber and discharge of measured quantities of the material to the feed trough means.

5 Claims, 7 Drawing Figures

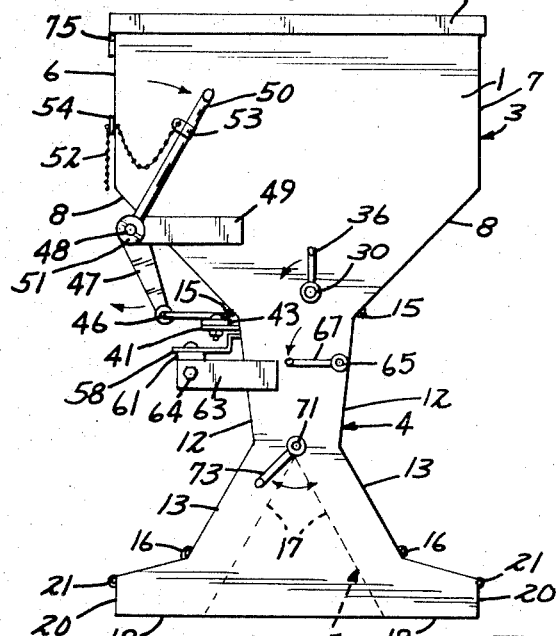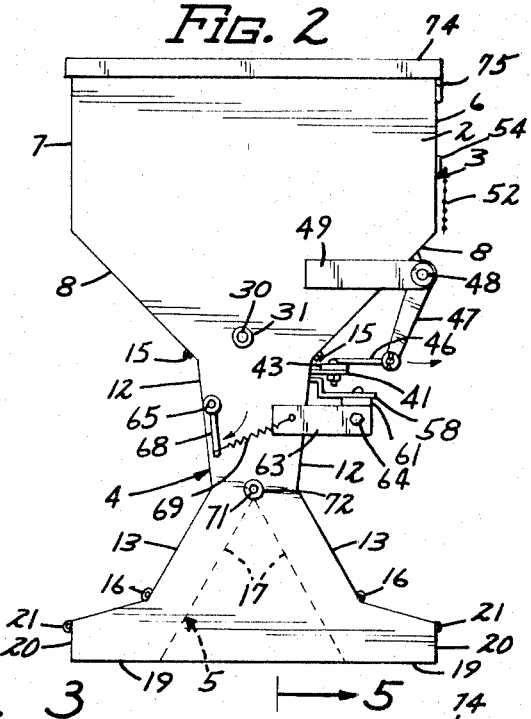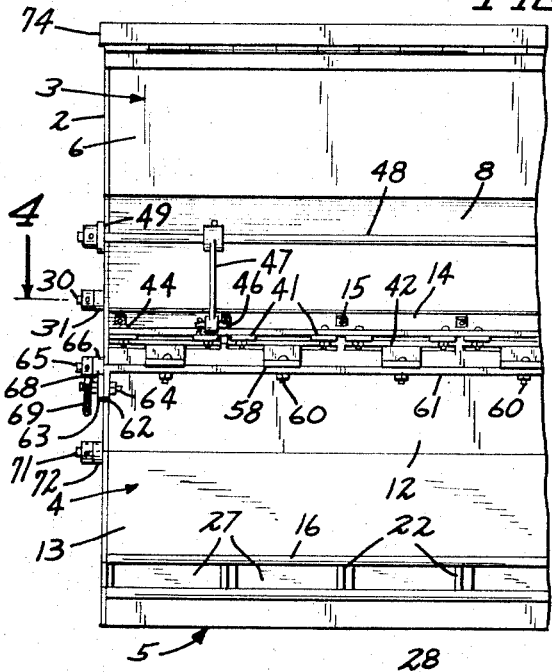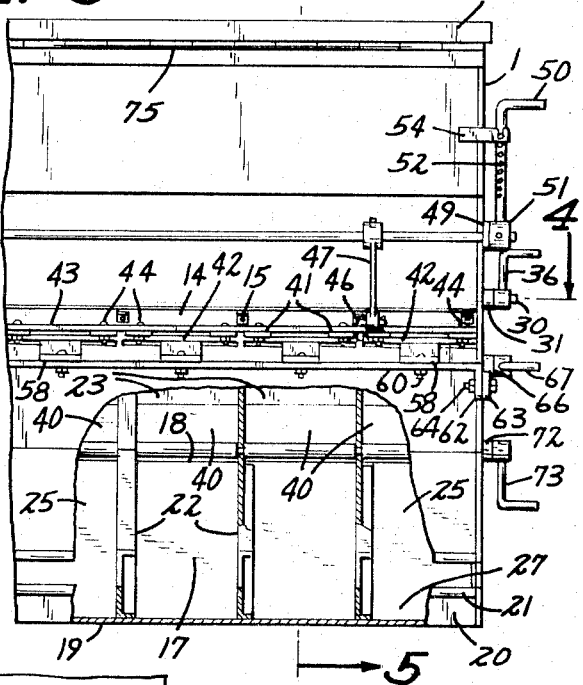

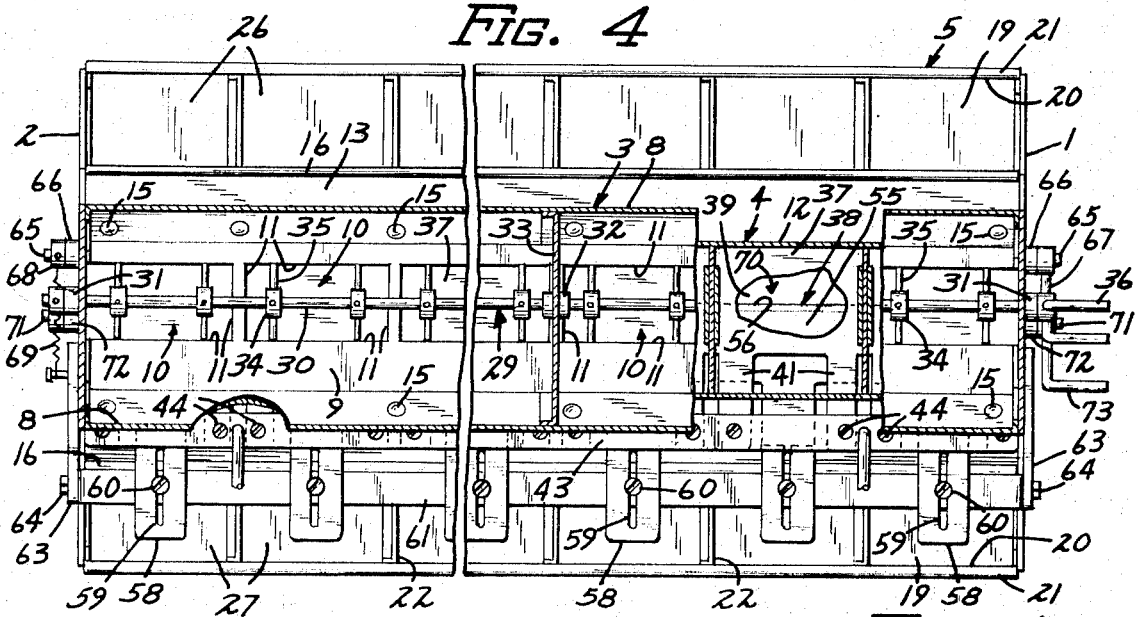
Fig. 4
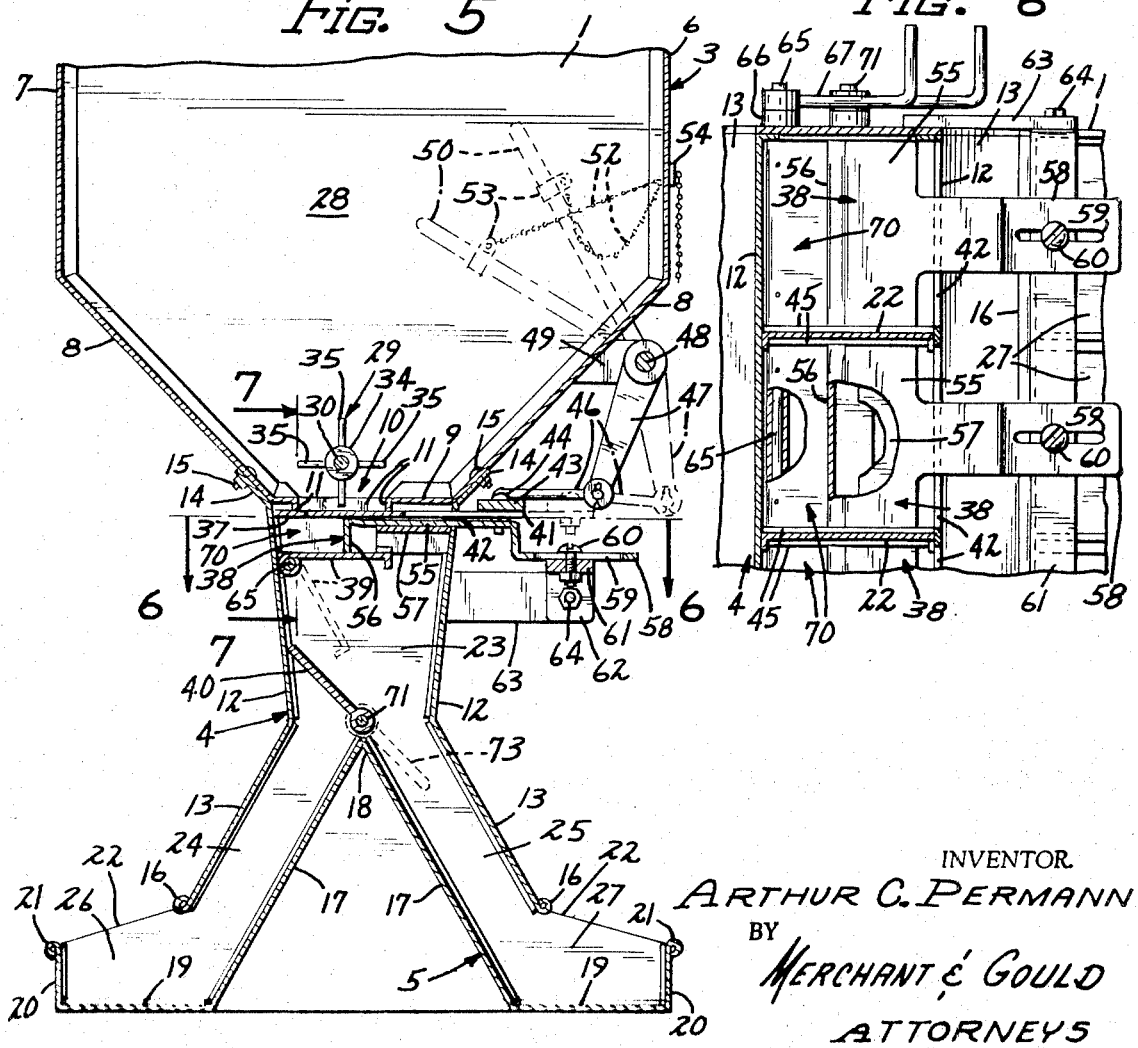
Fig. 5
Fig. 6
INVENTOR.
ARTHUR C. PERMANN
BY
Merchant & Gould
ATTORNEYS

ANIMAL FOOD SUPPLEMENT DISPENSER AND FEEDER

BACKGROUND OF THE INVENTION

In the feeding of livestock, such as hogs, particularly sows, it has been found highly advantageous to add supplements of various kinds to the regular animal feed for promoting growth or otherwise providing specialized nutriment. Special food supplements are quite expensive, and the manual feeding of such supplements in particular quantities for each animal in a group thereof, is an involved and laborious task. This is particularly true in instances where the food supplement requirements of any given animal are different from those of the other animals of the group.

SUMMARY OF THE INVENTION

An important object of this invention is the provision of a feeder for food supplement, in which the amount of supplement fed to a given animal may be accurately and easily controlled.

Another object of this invention is the provision of a feeder in which a plurality of animals may be fed a given amount of food supplement simultaneously, and wherein the amount of supplement for each animal is individually controlled independently of the others.

To the above ends, I provide a frame structure formed to include a generally horizontally elongated supply hopper having a bottom portion defining a plurality of longitudinally spaced discharge apertures, delivery conduits for the apertures, and a plurality of feed troughs receiving food supplement each from a different one of the conduits. Feeder valves, metering valves and discharge valves cooperate to define measuring chambers for reception of material from the supply hopper. The feeder valves open and close the hopper discharge apertures to control movement of material to each measuring chamber; the metering valves control the size of each measuring chamber; and the discharge valves are operable to control discharge of material from each measuring chamber to its respective feed trough. Each conduit, beyond its respective discharge value, is divided into a pair of conduit sections each leading to a different individual feeder trough; and each conduit is provided with a diverter valve for controlling flow of food material to the conduit sections of its respective conduit. A rotary agitator extends longitudinally within the supply hopper above the discharge apertures to prevent bridging of the food material and to aid in feeding material to the measuring chambers; and means for operating the agitator, feeder valves, discharge valves and diverter valves, are convenient to the operator at one end of the frame structure.

DESCRIPTION OF THE DRAWINGS

FIG. 1 is a view in end elevation of an animal food supplement dispenser and feeder produced in accordance with this invention;

FIG. 2 is a view in elevation of the opposite end of the dispenser and feeder of FIG. 1;

FIG. 3 is a view in side elevation, as seen from the left to the right with respect to FIG. 1, some parts being broken away and some parts being shown in section;

FIG. 4 is a fragmentary view, partly in top plan and partly in section, taken substantially on the line 4—4 of FIG. 3;

FIG. 5 is an enlarged fragmentary transverse section taken on the line 5—5 of FIG. 3;

FIG. 6 is a fragmentary horizontal section taken substantially on the line 6—6 of FIG. 5; and FIG. 7 is a fragmentary vertical section taken substantially on the line 7—7 of FIG. 5.

DETAILED DESCRIPTION OF THE PREFERRED EMBODIMENT

A frame construction is shown as comprising, a pair of longitudinally spaced vertical end walls 1 and 2, upper side wall structure 3, lower side wall structure 4, and bottom wall structure, indicated generally at 5. The upper side wall structure 3 is formed to provide laterally spaced vertical side wall portions 6 and 7, downwardly converging wall portions 8, and a generally horizontal bottom wall portion 9, opposite ends of the wall portions 6-9 being rigidly secured to the opposite end walls 1 and 2. The frame construction may be of sheet metal, wood, or any suitable material. The several wall structures being secured together by suitable well-known means, not shown. The bottom wall portion 9 is formed to provide a plurality of laterally spaced discharge apertures 10 defined by depending peripheral flanges 11, see particularly FIGS. 4, 5 and 7.

The lower side wall structure 4 comprises a pair of laterally spaced elongated panels bent to provide upper panel portions 12 that converge downwardly from the bottom wall portion 9, and downwardly diverging panel portions 13, the upper panel portions 12 being formed to provide angular flanges 14 that are rigidly secured to the downwardly converging wall portions 8 adjacent the bottom wall portion 9 by nut-equipped screws or the like 15. As shown, the lower edges of the panel portions 13 are formed to provide longitudinal beads or reinforcing portions 16.

The bottom wall structure 5 is formed to provide a pair of elongated inner walls 17 joined together at their upper edges to provide an apex portion 18, the walls 17 diverging downwardly in inwardly spaced parallel relation to adjacent ones of the lower panel portions 13. Further, the bottom wall structure 5 includes a pair of horizontal wall portions 19 that project laterally outwardly from respective ones of the walls 17, and which are formed to provide upstanding side wall portions 20 having reinforcing beads or portions 21 at their upper edges. With reference to FIGS. 1, 2 and 5, it will be seen that each bead or reinforcing portion 21 is disposed in laterally outwardly and slightly downwardly spaced parallel relation to a respective one of the beads or reinforcing portions 16.

Rigidly mounted between the panel portions of the lower side wall structure 4 and the bottom wall structure 5 is a plurality of longitudinally spaced transverse partitions 22 of inverted generally Y-shape, these partitions 22 being rigidly secured to the panel portions 12 and 13, the inner walls 17, horizontal wall portions 19 and side wall portions 20. The upper portions of the partitions 22 cooperate with the end walls 1 and 2 and the upper panel portions 12 to define a plurality of longitudinally spaced conduits 23 each extending downwardly from the bottom wall 9 and communicating at its upper end with a different one of the discharge apertures 10. The partitions 22 also cooperate with the lower end portions of the end walls 1 and 2, and with the lower panel portions 13 and inner walls 17 to define a plurality of pairs of discharge conduit sections 24 and 25 that extend downwardly from respective discharge conduits 23 to laterally spaced individual feed troughs 26 and 27 respectively. The feed troughs 26 and 27 are defined by the lower end portions of the end walls 1 and 2, the lower end portions of the partitions 22, the horizontal wall portions 19 and the side walls 20, each trough 26 and 27 having an open top portion between the reinforcing edges or beads 16 and 21.

The end walls 1 and 2, vertical wall portions 6 and 7, downwardly converging wall portions 8 and bottom wall portion 9 cooperate to define an open topped supply hopper 28 for holding a supply of animal food supplement, preferably in granular form. The food supplement material, not shown, is fed by gravity downwardly through the several discharge apertures 10 to their respective discharge conduits 23. For the purpose of aiding in the feeding of the food supplement material into and through the discharge apertures 10, I provide an agitator 29 comprising an agitator shaft 30 journaled in bearings 31 in the end walls 1 and 2 and intermediate bearings 32 mounted in transverse partition elements 33, one of which is shown in FIG. 4. The agitator 29 further includes a plurality of axially spaced mounting collars or the like 34 rigidly mounted on the agitator shaft 30, and from which project radial agitator pegs or fingers 35. Rotation is imparted to the agitator 29 to aid in feeding the food supplement material downwardly through the several discharge apertures 10 by means of a crank 36 mounted on one end of the agitator shaft 30 exterior of and adjacent the end wall 1, see particularly FIGS. 1 and 4.

Disposed within each discharge conduit 23 are one each of a plurality of feeder valves 37, metering valve elements 38, discharge valves 39 and diverter valves 40. The feeder valves 37 are each in the form of a flat horizontally disposed plate-like member, each feeder valve 37 being disposed in underlying sliding engagement with the peripheral flange 11 of a respective discharge aperture 10. Each feeder valve 37 has a bifurcated outer end 41 which projects laterally outwardly through a slot-like opening 42 and is rigidly secured to an elongated rigid connector bar 43 by means of nut-equipped screws or the like 44. Each feeder valve 37 is supported at its opposite side edges by supporting strips 45, see particularly FIG. 7. The connector bar 43 extends longitudinally of the feeder and is connected to a pair of longitudinally spaced pitman arms 46 that are pivotally connected to the radially outer ends of a pair of crank arms 47 the inner ends of which are fixed on a crankshaft 48 journaled in bearing brackets 49 rigidly secured to the end walls 1 and 2. A manually operated lever 50 extends radially outwardly from a mounting collar 51 that is rigidly secured to one end of the crankshaft 48 adjacent the end wall 1, for imparting rocking movements to the crankshaft 48 whereby to open and close the feeder valves 37. An elongated flexible member in the nature of a link chain 52 is connected at one end to the lever 50, by means of an anchoring clip 53. The chain 52 is adapted to be adjustably mounted in or carried by a slotted catch element 54 to limit movement of the lever 50 in a feeder valve opening direction.

Each metering valve element 38 includes a horizontally disposed plate-like portion 55 that projects outwardly through the adjacent opening 42, and a downturned vertically disposed lip 56 extending transversely of its respective discharge conduit 23, parallel to the upper panel portions 12. Each measuring valve element 38 is supported for sliding movement toward and away from the opposite panel portions 12 by supporting plates or the like 57 secured at their opposite sides to adjacent ones of the supporting strips 45. Outwardly of the discharge conduits 23, each measuring valve element is provided with a laterally outwardly projecting tail portion 58 having therein an elongated slot 59 through which extends a nut-equipped anchoring or clamping screw 60 that extends through one of a plurality of longitudinally spaced openings in a rigid bar 61 that extends longitudinally of the frame structure and is provided at its outer ends with down-turned flanges 62 that are secured to mounting bars 63 anchored to and projecting laterally outwardly from the end walls 1 and 2. The flanges 62 are secured to the mounting bars 63 by nut-equipped screws or the like 64.

Each discharge valve 39 is in the nature of a flat plate-like member and underlies a respective one of the feeder valves 37 and metering valve elements 38, each discharge valve 39 being rigidly secured at one end to a shaft 65 that extends longitudinally with respect to the hopper 28 and transversely through each discharge conduit 23 adjacent one of the upper panel portions 12. The shaft 65 is journaled at its opposite end portions in bearings 66 mounted on the end walls 1 and 2, and adjacent the end wall 1, the shaft 65 is provided with a discharge valve lever 67 by means of which rocking movements may be imparted to the shaft 65 to move the several discharge valves 39 between valve closed positions, as shown by full lines in FIG. 5, and valve open positions as shown by dotted lines in FIG. 5. Adjacent the end wall 2, the shaft 65 is provided with a crank arm 68 to the radially outer end of which is secured one end of a coil compression spring 69 that is connected at its opposite end to the adjacent mounting bar 63, see particularly FIG. 2, the spring 69 yieldingly urging the crank arm 68 in a direction to move the discharge valves 39 toward their valve closed positions in underlying engagement with the vertical lips or walls 56 of their respective metering valve elements 38.

With reference particularly to FIGS. 4-6, it will be seen that each feeder valve 37 cooperates with its respective metering valve element 38, discharge valve 39, and adjacent wall portions of its respective conduit 23 to define a measuring chamber 70. Each measuring chamber 70 is adjustable as to size by movement of its respective metering valve element 38 transversely with respect to the mounting bar 61. With this arrangement, each feeding trough 26 and 27 may be supplied with an accurately measured amount of food supplement from the supply hopper 28 at each feeding interval. With the various metering valve elements 38 set as required, food supplement is fed to each measuring chamber 70 by manipulating the lever 50 to open all of the feeder valves 37. Preferably, the valves 37 are opened to the extent that the free edges thereof are disposed in a common vertical plane with the lip or wall 56 of the valve element 38 that is moved furthest to the right with respect to FIG. 5, or which is positioned to provide the largest measuring chamber 70. The extent of opening movement of the feeder valves 37 is determined by the length of chain 52 between the clip 53 and the catch element 54. When the feeder valves 37 are opened, rotation of the agitator 29 will cause the material in the hopper 28 to flow into and fill all of the measuring chambers 70, after which the feeder valves 37 are closed, and the lever 67 is manipulated to move the discharge valves 39 to their open positions to permit the food material to flow downwardly through the discharge conduits 23.

Each of the diverter valves 40 is in the nature of a flat plate-like member that is rigidly secured along one edge to an elongated shaft 71 that extends through the delivery conduits 23 just above the apex portion 18 of the inner walls 17, the shaft 71 being journaled in bearings 72 on the end walls 1 and 2. Adjacent the end wall 1, the diverter valve shaft 71 is provided with a crank 73 by means of which all of the diverter valves 40 may be positioned to guide material discharged from the several measuring chambers 70 to the discharge conduit sections 24 or, selectively, to the discharge conduit sections 25. Thus, with the several metering valves 38 set as desired, and the diverter valves 40 positioned to cause delivery of food material to the selected feed troughs 26 or 27, the operator needs only to open the feeder valves 37, rotate the agitator 29 for several revolutions, close the feeder valves 37 and open the discharge valves 39 momentarily to permit food material to be dumped from the measuring chambers 70, after which the operator releases the discharge valve operating lever 67 to permit the spring 69 to re-close the discharge valves 39.

Although not shown, it will be appreciated that each of the feed troughs 26 and each of the opposite feed troughs 27 will be disposed to different ones of a plurality of animal pens, so that each animal contained in a given pen will receive a given predetermined amount of the food supplement dispensed by the above-described feeder, at each feeding thereof. In the event that some animal pens are unoccupied and it is desired that feeding of food supplement to the unoccupied pens be discontinued, it is only necessary to disconnect the respective feeder valves 37 from the connector bar 43 by removing their respective screws 44 and manually closing those feeder valves 37.

As shown in FIGS. 1-3, the top of the supply hopper 28 is normally closed by a cover element 74 that is hinged to the vertical wall portion 6, as indicated at 75.

While I have shown and described a commercial embodiment of my animal feed supplement dispenser and feeder, it will be understood that the same is capable of modification without departure from the spirit and scope of the invention, as defined in the claims.

What is claimed is:

1. An animal food supplement feeder comprising:
   a. frame structure including an elongated supply hopper having a bottom portion defining a plurality of longitudinally spaced discharge apertures;
   b. means defining a plurality of delivery conduits one for each of said discharge apertures;
   c. feed trough means each disposed for reception of food supplement from a different one of said delivery conduits;
   d. a plurality of feeder valves each mounted in a different one of said delivery conduits for movements toward and away from closing relationship with an adjacent one of said discharge apertures, said feeder valves comprising generally horizontally disposed flat plate-like valve elements each normally underlying a different one of said discharge openings and mounted for generally horizontal sliding movements toward and away from underlying closing relationship with a respective one of said discharge openings;
   e. a discharge valve in each of said delivery conduits in spaced relation to a respective one of said feeder valves, each discharge valve being disposed in underlying spaced relation to a respective one of said plate-like valve elements;
   f. a plurality of metering valve elements each disposed between a different one of said feeder valves and its underlying valve and each being adjustable independently of the others thereof;
   g. each delivery conduit cooperating with its respective feeder and discharge valves and metering valve element to define a respective measuring chamber;
   h. feeder valve operating means for opening said feeder valves simultaneously to admit flow of food supplement from said hopper to each of said measuring chambers to fill said chambers, and for closing said feeder valves, said feeder valve operating means comprising;
      1. a connector rigidly secured to all of said plate-like elements,
      2. a rock shaft extending longitudinally of said hopper,
      3. a pair of crank members on said rock shaft connected to longitudinally spaced portions of said connector, and
      4. a lever on said rock shaft for imparting feeder valve operating rocking movement to said rock shaft;
   i. and means for opening said discharge valves simultaneously to discharge the food from all of said measuring chambers to their respective feed trough means.

2. The feeder defined in claim 1, characterized by means for varying the limit of movement of said feeder valves in a direction away from closing relationship with their respective discharge openings and including an elongated member connected at one end to said lever and a catch element on said frame structure, said elongated member having longitudinally spaced portions selectively engageable with said catch element.

3. The feeder defined in claim 1 in which each of said discharge valves includes a flat plate-like valve member having one end secured to an elongated shaft extending longitudinally of said hopper and journalled for rotation within said delivery conduits, said means for opening said discharge valves comprising a discharge valve lever mounted on said elongated shaft at one end of said frame structure.

4. The feeder defined in claim 3, characterized by yielding means urging said elongated shaft in a direction of rotation to move said valve members toward valve closed positions, said discharge valve lever being operative to rotate said elongated shaft in a discharge valve opening direction against bias of said yielding means.

5. The feeder defined in claim 1 in which each of said feed trough means comprises a pair of spaced apart individual feed troughs, said delivery conduits each including a pair of branch conduit sections, each of said branch conduit sections leading to a different one of said individual feed troughs, diverter valves in said delivery conduits for directing material into said branch conduit sections selectively, a diverter valve operating shaft extending through said delivery conduits longitudinally of said frame structure and journaled for limited rotary movements, each of said diverter valves being secured to said valve operating shaft for common limited rotary movement therewith, and an operating lever on said valve operating shaft at one end thereof.

* * * * *